Sept. 19, 1967 J. C. SEATON ETAL 3,342,504
CONDUIT SKID
Filed March 9, 1966
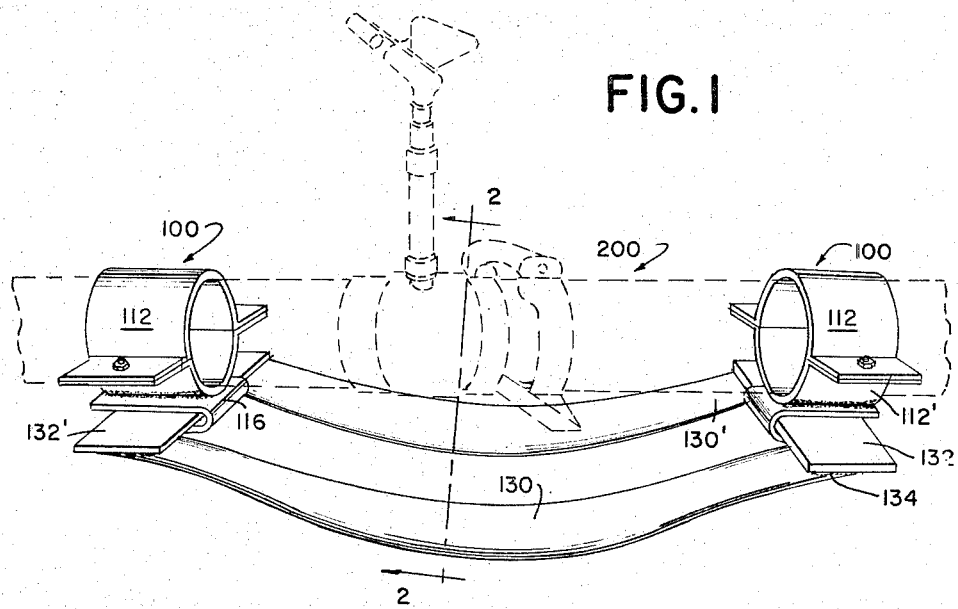
FIG.1
FIG.2
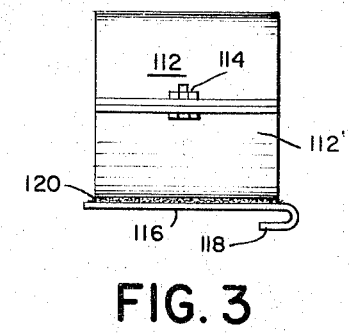
FIG.3
INVENTORS
CLAYTON H. LITTLEFIELD
J.C. SEATON
BY
Semmes & Semmes
ATTORNEYS

United States Patent Office 3,342,504
Patented Sept. 19, 1967

3,342,504
CONDUIT SKID
John C. Seaton and Clayton H. Littlefield, both of
1203 W. Main St., Brownfield, Tex. 79316
Filed Mar. 9, 1966, Ser. No. 532,910
4 Claims. (Cl. 280—12)

The present invention relates to the transport of joined sections of conduits as for example irrigation pipe. More specifically, the invention relates to means for engaging and disengaging a suitable skid from joined conduit sections of irrigation pipe, avoiding thereby the necessity of disassembly of the pipe in moving from one area to another.

Among the advantages of the invention are: The adaptability of the assembly to irrigation conduits of varying size; the quick latching and unlatching of the drag runners to the joined pipe sections; and minimized resistance to straight line and turning drag over cultivated terrain. It is desirable not only to provide stability to irrigation conduits in transit, but also to present the least possible ground resistance to any unit of this type, which may be designed to support irrigation conduits sufficiently high above cultivated ground to prevent damage to bell and spigot connections, the sprinkler and related elements. Among the more important objectives of the invention is the provision of a novel means for the drag transport of assembled hydraulic conduits in which, skids may be removed for relocation and use elsewhere, without complete disassembly of the elements comprising the irrigation pipe connection supporting media. With these and other objectives in view, the invention is more clearly represented by the following drawings, in which:

FIG. 1 is a view in perspective of the invention showing a conventional irrigation pipe junction adapted to support for transport;

FIG. 2 is a sectional view of the invention of FIG. 1 taken along the lines 2—2 thereof;

FIG. 3 is a side elevation view of the means employed in removably securing the skids to the hydraulic conduit connection.

Referring more especially to FIG. 1, the corresponding yokes 100 comprise clamping sections 112 and 112' respectively, these sections being secured for either tight clamping transit engagement or loose and skid detachable, slidable movement along the pipe 200 by means of locking bolts 114. It will be appreciated that by virtue of the clamp design, the yokes being resilient may be adapted to hydraulic conduits 200 which are of varying size. In practice, the yokes 100 are ideally adapted to tight frictional fit along a circumferential area of the conduit 200, providing thereby a suitable latch base for the skid hereinafter defined. The latch plate 116 is welded at 120 to the corresponding clamp section 112', the plate being aligned longitudinally with the axis of the conduit 200. The plate 116 having curvilinear extension 118 forming the latch is secured by weldment at 120 to the clamp section 112' as best shown in FIG. 3. The plate is adapted to receive in locking engagement spacer plate 132 of the skids 130-130'.

Skids 130 and 130' are tubular in cross-section, being deformed by flattening at their ends, whereby attachment to the spacers 132 may be effected by weldment 134, best shown in FIG. 2. It is noteworthy that the runners 130 and 130' are spaced apart a distance which is at least as wide as the width or diameter of the conduit 200. In this way an isosceles triangular relationship between the axes of the conduit and runners is formed, thereby lending stability to the unit in transit.

The skid assembly is mounted to and beneath the pipe in the obvious manner, that is, the coupled pipe sections are raised where the skid to be applied, the two yokes are mounted on the pipe to be slidably adjustable thereon, the skid is placed under the raised pipe, the two yokes are slid on the pipe into locking engagement with the respective spacer plates of the skid, the yokes are then securely clamped to the pipe and the pipe is then lowered until the runners of the skid rest on the ground.

In transit, the yokes 112 have been extended into opposed force, latching engagement with the corresponding spacers 132, locked into position to anchor the skids to the pipe junction for transit. The rigidity given the system in preventing bending moments to the pipe connection will be apparent, but occurs as one of the objectives of invention. To disassemble the skids simply requires a loosening of the yokes and unlatching of the unitary skid 130-130'.

From the foregoing it is apparent that numerous alternative arrangements can be designed without departing from the spirit and objectives of invention as set forth in the appended claims.

We claim:
1. Means for engaging and disengaging a skid to and from coupled together conduit sections of irrigation pipe without necessitating uncoupling the conduit sections of the pipe, said means comprising:
    (A) a pair of skid engageable yokes each adapted to be applied detachably about an irrigation pipe from a direction transversely of the pipe to be slidable along the pipe,
    (B) clamping means on each of said yokes for fixedly clamping said yokes to said pipe in longitudinally adjusted position thereon and for unclamping said yokes from the pipe, and
    (C) each of said yokes having locking means slidable with the yokes longitudinally of the pipe into and out of locking engagement with the said skid disposed beneath the pipe, the said locking means on the respective yokes including a horizontally open locking hook with the openings of the respective hooks facing in opposite directions longitudinally of the pipe.

2. A skid assembly attachable to and detachable from coupled together sections of irrigation pipe without necessitating uncoupling the conduit sections of the pipe, which assembly comprises, in combination,
    (A) a skid having laterally spaced pipe-supporting runners and a pair of spaced spacer plates fixed to said runners and holding said runners in spaced relation to each other,
    (B) a pair of yokes, each comprising two complementary sections relatively movable into and out of embracing position about an irrigation pipe, to be slidable thereon,
    (C) means on each of said yokes operable to clamp the yoke to the pipe in slidably adjusted position thereon and to unclamp the yoke from the pipe, and
    (D) each of said yokes having a horizontally open locking hook slidable with its yoke into and out of locking engagement wtih a respective spacer plate of the skid, the locking hooks of the two yokes facing in opposite directions longitudinally of the pipe whereby said hooks are movable into opposed force engagement with said spacer plates and said skid attached to the pipe.

3. A skid assembly attachable to and detachable from coupled together sections of irrigation pipe without necessarily uncoupling the conduit sections of the pipe, which assembly comprises, in combination,
    (A) a skid having laterally spaced pipe-supporting runners and a pair of spacer plates fixed to said runners and holding said runners in spaced relation to each other, (B) a pair of yokes, each comprising two complementary parts relatively movable into and out of embracing position about an irrigation pipe and slidable thereon longitudinally thereof, (C) means on each of said yokes operable to clamp the yoke to the pipe in slidably adjusted position thereon and to unclamp the yoke from the pipe, and (D) each of said yokes having a locking device slidable therewith longitudinally of the pipe into and out of locking engagement with a respective spacer plate of the skid, and whereby by slidably adjusting the yokes on the pipe the skid may be attached to or dismounted from the yokes and pipe.

4. A skid assembly as set forth in claim 3 and in which the runners of the skid are tubular and have raised and flattened ends.

References Cited

UNITED STATES PATENTS

| | | | |
|---|---|---|---|
| 902,863 | 11/1908 | Darrow | 280—12 |
| 2,990,121 | 6/1961 | Fischer | 239—213 |
| 3,255,968 | 6/1966 | Stafford | 239—212 |

BENJAMIN HERSH, *Primary Examiner.*

L. D. MORRIS, *Assistant Examiner.*